(12) United States Patent
Takano et al.

(10) Patent No.: US 10,259,115 B2
(45) Date of Patent: Apr. 16, 2019

(54) WORK DEVICE

(71) Applicant: Panasonic Intellectual Property Management Co., Ltd., Osaka (JP)

(72) Inventors: Ken Takano, Osaka (JP); Satoru Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 15/370,141

(22) Filed: Dec. 6, 2016

(65) Prior Publication Data

US 2017/0173792 A1  Jun. 22, 2017

(30) Foreign Application Priority Data

Dec. 17, 2015  (JP) .................................. 2015-245854

(51) Int. Cl.
*B25J 9/10*  (2006.01)
*B25J 9/00*  (2006.01)
*B25J 9/16*  (2006.01)
*B25J 13/08*  (2006.01)

(52) U.S. Cl.
CPC ........... *B25J 9/0051* (2013.01); *B25J 9/1623* (2013.01); *B25J 13/085* (2013.01); *B25J 13/088* (2013.01); *B25J 9/1666* (2013.01); *Y10S 901/02* (2013.01)

(58) Field of Classification Search
CPC ...... B25J 13/088; B25J 9/1623; B25J 9/1674; Y10S 901/02

USPC .................................................. 700/245, 256
See application file for complete search history.

(56) References Cited

U.S. PATENT DOCUMENTS

| | | | | |
|---|---|---|---|---|
| 5,765,443 A | * | 6/1998 | Murase ................ | B25J 17/0258 74/490.05 |
| 2011/0097184 A1 | * | 4/2011 | Kinoshita ............ | B25J 17/0266 414/589 |

FOREIGN PATENT DOCUMENTS

| | | |
|---|---|---|
| JP | H03-075904 A | 3/1991 |
| JP | H03-098786 A | 4/1991 |
| JP | H09-251308 A | 9/1997 |
| JP | 2002-258901 A | 9/2002 |
| JP | 2003-025263 A | 1/2003 |
| JP | 2013-059852 A | 4/2013 |
| JP | 2014-217913 A | 11/2014 |

* cited by examiner

*Primary Examiner* — Dalena Tran
(74) *Attorney, Agent, or Firm* — Pearne & Gordon LLP (57) ABSTRACT

A work device includes a base unit, a movable unit configured to have an end effector mounted thereto, linking mechanisms linking the base unit to the movable unit, actuators fixed to the base unit for driving the plurality of linking mechanisms, respectively, and a controller that moves the end effector by operating the actuators. A certain linking mechanism out of the plurality of linking mechanisms includes a joint. The controller includes a joint angle determination unit that determines whether or not a bending angle of the linking mechanism at the joint is within an operable range.

9 Claims, 7 Drawing Sheets

WORK DEVICE

BACKGROUND

1. Technical Field

The present invention relates to a work device which performs work using an end effector that is mounted on a movable unit which is moved by a plurality of linking mechanisms.

2. Description of the Related Art

A parallel link robot, with a configuration in which the movable unit on which the end effector such as a component gripping tool is mounted, is driven by the plurality of linking mechanisms is known as a work device that is used in an industrial application. In the parallel link robot, it is difficult to intuitively ascertain a correspondence relationship between a space position of a movable unit and axial coordinates which indicate a rotary position of a motor that drives the linking mechanisms caused by a characteristic of a mechanism configuration. Therefore, a movable range in which it is possible to safely move the movable unit without generating mechanical interference during operation of the parallel link robot is demarcated associated with axial coordinates that indicate the rotary position of the motor and is stored as movable area data (for example, refer to Japanese Patent Unexamined Publication No. 2003-25263 and Japanese Patent Unexamined Publication No. 2014-217913).

In the related art indicated in Japanese Patent Unexamined Publication No. 2003-25263, the movable area in which operation of the movable unit is permissible is demarcated in advance in a column shape to be stored, a current position and posture is calculated based on a detection signal of a position detector during operation, and interference or an uncontrollable situation is coped with by comparing with the stored movable area. In addition, in the related art indicated in Japanese Patent Unexamined Publication No. 2014-217913, a second movable range that is smaller than a first movable range is set in advance further on the safe side in addition to the first movable range that indicates the movable area on the structure demarcated based on the configuration of the robot, and an example is described in which a warning is issued in a case where the current position is outside the second movable range.

SUMMARY

A work device includes a base unit, a movable unit configured to have an end effector mounted thereto, linking mechanisms linking the base unit to the movable unit, actuators fixed to the base unit for driving the plurality of linking mechanisms, respectively, and a controller that moves the end effector by operating the actuators. A certain linking mechanism out of the plurality of linking mechanisms includes a joint. The controller includes a joint angle determination unit that determines whether or not a bending angle of the linking mechanism at the joint is within an operable range.

The work device can prevent interference caused by performing a bending operation exceeding the operable range in the joint.

DETAILED DESCRIPTION

Figure 1:
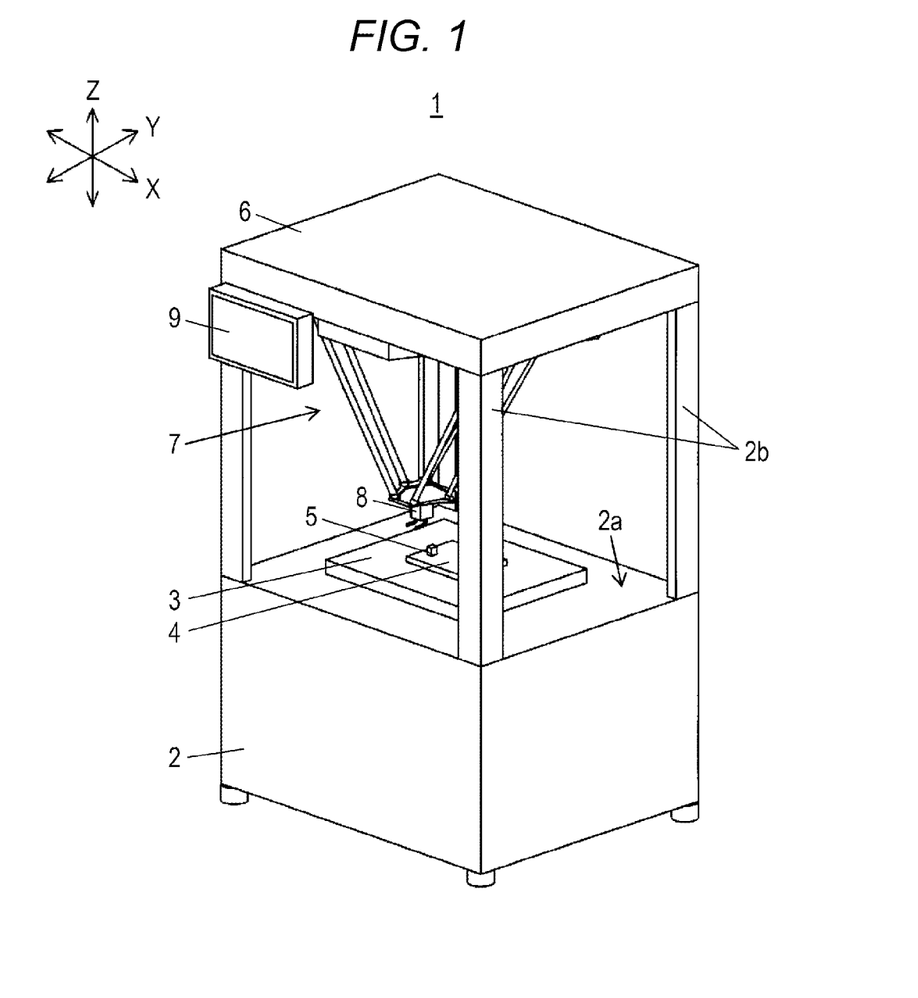
FIG. 1 is a perspective view illustrating the entire configuration of a work device of an embodiment.

The entire configuration of work device 1 in the embodiment will be described with reference to FIG. 1. In FIG. 1, mounting stage 3 is provided on work base 2a on an upper surface of base 2, and workpiece 4 that is a work target is mounted on mounting stage 3. Component 5 is assembled on workpiece 4 using work robot 7 that is described below.

Corner post 2b is erected on a corner of work base 2a, and horizontal stand 6 is constructed on an upper end of corner post 2b. Work robot 7 that is provided with a parallel linking mechanism is disposed on a lower surface of stand 6. Work robot 7 grips component 5 using end effector 8 and performs assembly work on workpiece 4.

Operation panel 9 that is provided with a touch panel is disposed on a side surface of stand 6. An operation in which work robot 7 is the target or instruction input for operation instruction is executed by touch operation input via operation panel 9. Note that, in a coordinate system of work device 1, a horizontal direction on the left and right viewed from the front surface of the work device is an X axis, an axis which is orthogonal in a front and back direction to the X axis is a Y axis, and an axis which is perpendicular in the up and down direction to the X axis and the Y axis is a Z axis.

Figure 2:
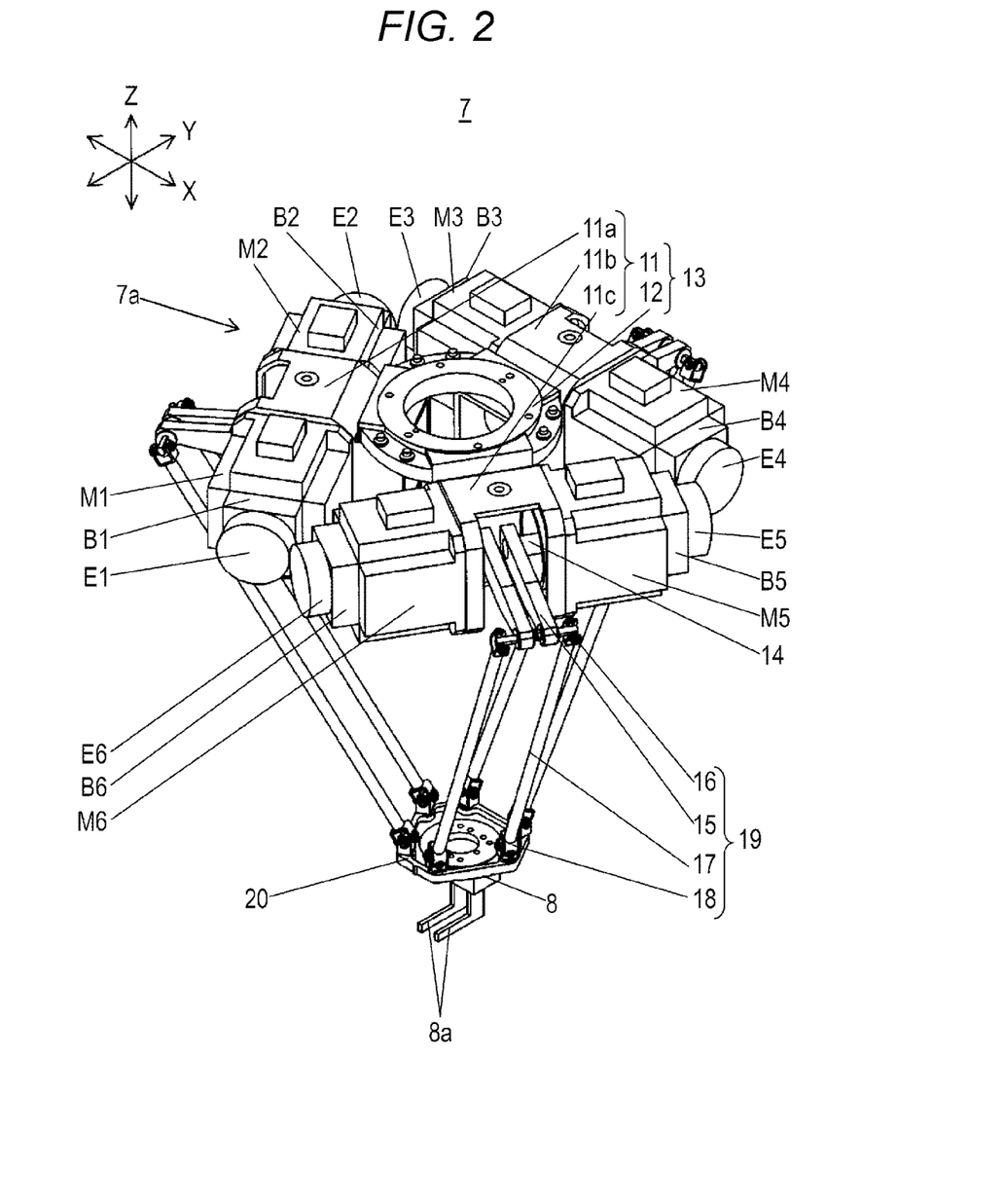
FIG. 2 is a perspective view illustrating a configuration of a work robot that is built into the work device of the embodiment.

Next, the configuration and function of work robot 7 will be described with reference to FIG. 2. Work robot 7 is a parallel link robot that has six degrees of freedom. Base unit 7a that is illustrated in FIG. 2 is a mechanism for operating each unit that is described below with a built-in driving source in work robot 7, and is mounted on the lower surface of stand 6. That is, base unit 7a is fixedly fastened on the lower surface of stand 6 using mounting unit 12 with an annular shape that is disposed in the center. From mounting unit 12, three motor brackets 11 (brackets 11a, 11b, and 11c) are provided extending in a radial direction respectively at three equal distribution positions in a peripheral direction. Motor bracket 11 and mounting unit 12 configure work robot main body 13 in work robot 7.

Two motors M with servo control methods are disposed in series in each motor bracket 11 at a posture facing a drive shaft. That is, motor M1 which is provided with encoder E1 and brake B1 that are disposed on the same axis and motor M2 which is provided with encoder E2 and brake B2 that are similarly disposed on the same axis are fixed on bracket 11a in a posture facing the drive shaft.

In addition, motor M3 which is provided with encoder E3 and brake B3 that are disposed on the same axis and motor M4 which is provided with encoder E4 and brake B4 that are similarly disposed on the same axis are fixed on bracket 11*b* in a posture facing the drive shaft. Furthermore, motor M5 which is provided with encoder E5 and brake B5 that are disposed on the same axis and motor M6 which is provided with encoder E6 and brake B6 that are similarly disposed on the same axis are fixed on bracket 11*c* in a posture facing the drive shaft.

Note that, in the following description, except for a case where it is necessary to individually specify and distinguish each of six elements of motors M1 to M6, brakes B1 to B6, and encoders E1 to E6 which are provided in work robot 7, the elements are simply described collectively as motor M, brake B, and encoder E.

Here, concerning the function of motor M that is fixed at the disposition described above on base unit 7*a* of work robot 7, motor M5 in which drive shaft 14 is clearly illustrated in FIG. 2 is described as a representative example. Arm member 15 which extends from the center of base unit 7*a* to the outside in the radial direction is linked to drive shaft 14 of motor M5. Arm member 15 swings around drive shaft 14 within a vertical plane by rotating drive shaft 14 in forward and reverse directions to drive motor M5.

Linking member 17 extends downward and is linked to the tip end of arm member 15 via first joint 16 that is a universal joint. Furthermore, the lower end of linking member 17 is linked to movable unit 20 via second joint 18 that is a universal joint. End effector 8 is mounted on the lower surface of movable unit 20, and in the example indicated here, an example of a component gripping tool which is provided with two gripping claws 8*a* is indicated as an end effector 8.

In the configuration described above, arm member 15, first joint 16, linking member 17, and second joint 18 configure linking mechanism 19 that moves movable unit 20. Then, linking mechanism 19 is provided to all of six motors M (motors M1 to M6) that are fixed to base unit 7*a*, and respective motors M operate as motive force sources of corresponding linking mechanism 19.

That is, work robot 7 that is indicated in the present embodiment is configured to be provided with movable unit 20 on which end effector 8 is mounted, a plurality of linking mechanisms 19 that link base unit 7*a* and movable unit 20, and motors M (motor M1 to motor M6) that are a plurality of (here, six) actuators that are fixed to base unit 7*a* and operate as the motive force source of linking mechanism 19 provided individually in each linking mechanism 19.

Then, in the operation of linking mechanism 19 by motors M, encoder E outputs pulse data that indicates an amount of rotation of motor M. In other words, encoder E functions as a position detector that outputs coordinate data that indicates the amount of operation of linking mechanism 19. In addition, in the operation of linking mechanism 19 by motor M, operation of linking mechanism 19 is limited by braking motor M by operating brake B.

In a fixed coordinate system that is set within a space on work base 2*a* of work device 1, it is necessary for movable unit 20 to have six degrees of freedom in order for the position and posture of movable unit 20 that is provided in work robot 7 to be freely defined. In work robot 7 that is indicated in the present embodiment, six sets of linking mechanisms 19 and motors M with the configuration described above are provided, motors M of respective sets are individually and independently controlled, and thereby it is possible to freely set the position and posture of movable unit 20.

Here, the position and the posture of movable unit 20 are changed according to a rotation angle of six arm members 15, and it is possible to obtain the position and the posture of movable unit 20 using coordinate data that is output from encoder E as the position detector described above which is provided in each motor M. Then, in teaching work and the like for teaching the work operation by grasping with work robot 7, in a case where it is necessary to hold the position and the posture of movable unit 20, motor M is braked by operating brake B at a desired timing, and movable unit 20 holds the position by stopping operation.

Figure 3A:
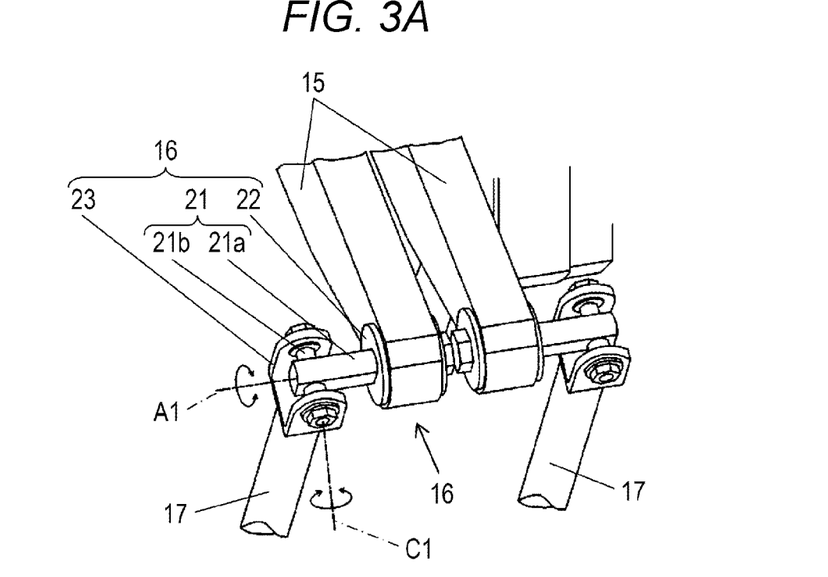
FIGS. 3A to 3C are explanatory diagrams of a bending angle of a first joint which is used in the work robot that is built into the work device of the embodiment.

Next, a detailed structure of first joint 16 and second joint 18 which configure linking mechanism 19 and the bending angle in the joints will be described with reference to FIGS. 3A to 3C and 4A to 4C. FIG. 3A indicates the detailed structure of first joint 16 that is linked to the tip end of arm member 15. First rotation shaft 21*a* is rotatably supported in a cantilevered form on the tip end of arm member 15 via bearing 22. First rotation shaft 21*a* is rotatably supported in a horizontal direction at a right angle with respect to an extension direction of arm member 15, and freely rotates about center of rotation line A1 in the horizontal direction.

Second rotation shaft 21*b*, which mutually intersects with first rotation shaft 21*a* and has center of rotation line C1 which is orthogonal to center of rotation line A1, is linked to first rotation shaft 21*a*. Second rotation shaft 21*b* is rotatably supported in a form of being supported on both ends in bearing 23 with a substantially U shape that is linked to the upper end of linking member 17. Due to this configuration, linking member 17 freely rotates about center of rotation line C1. In the configuration described above, first rotation shaft 21*a* and second rotation shaft 21*b* configure cross joint 21. Then, first joint 16 that is a universal joint is configured by cross joint 21 in conjunction with bearing 22 and bearing 23. That is, first joint 16 is a universal joint that has first rotation shaft 21*a* and second rotation shaft 21*b* which intersect with each other.

Figure 3B:
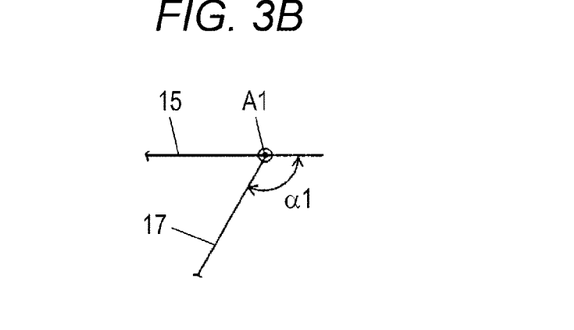
Figure 3C:
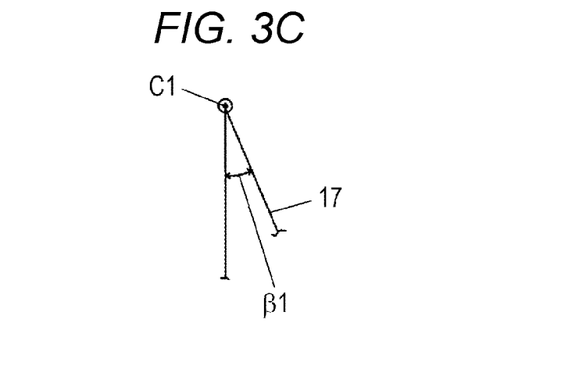

In the operation of linking mechanism 19 in work robot 7, operation of arm member 15 is transferred to linking member 17 while first joint 16 is bent. FIGS. 3B and 3C indicate a bending angle of first joint 16 during operation of linking mechanism 19. That is, as shown in FIG. 3B, first bending angle $\alpha 1$ is an angle about center of rotation line A1 formed between an extension line of arm member 15 and an axis line of linking member 17. In addition, second bending angle $\beta 1$ indicated in FIG. 3C is an angle about center of rotation line C1 formed between the Z axis (refer to FIGS. 1 and 2) and an axis line of linking member 17.

Figure 4A:
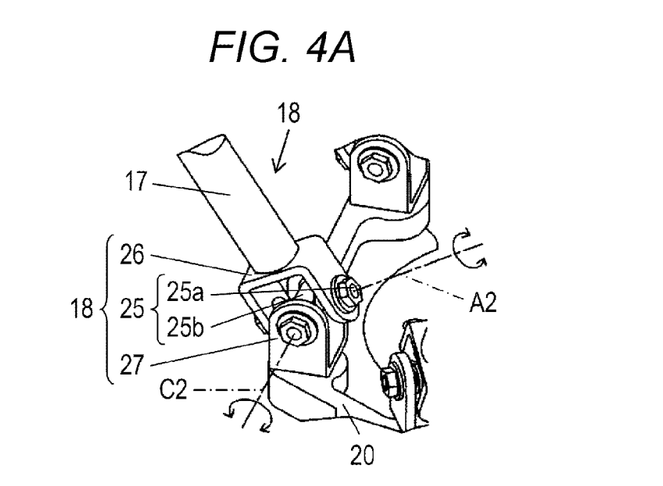
FIGS. 4A to 4C are explanatory diagrams of the bending angle of the first joint which is used in the work robot that is built into the work device of the embodiment.

FIG. 4A indicates the detailed structure of second joint 18 that is linked to the lower end of linking member 17. First rotation shaft 25*a* is rotatably supported in a form of being supported on both ends on the lower end of linking member 17 via bearing 26 with a substantially U shape. First rotation shaft 25*a* is rotatably supported in a direction which is orthogonal to the axis line direction of linking member 17, and linking member 17 freely rotates about center of rotation line A2.

Second rotation shaft 25*b*, which is mutually intersects with first rotation shaft 25*a* and has center of rotation line C2 which is orthogonal to center of rotation line A2, is linked to first rotation shaft 25*a*. Second rotation shaft 25*b* is rotatably supported in a form of being supported on both ends of bearing 27 with a substantially U shape, and bearing 27 is linked in a state in which rotation about a perpendicular axis on the upper surface of movable unit 20 is permissible. Then, second rotation shaft 25*b* freely rotates about center of rotation line C2. In the configuration described above, first rotation shaft 25a and second rotation shaft 25b configure cross joint 25. Then, second joint 18 that is a universal joint is configured by cross joint 25 in conjunction with bearing 26 and bearing 27. That is, second joint 18 is a universal joint that has first rotation shaft 25a and second rotation shaft 25b which intersect with each other.

Figure 4B:
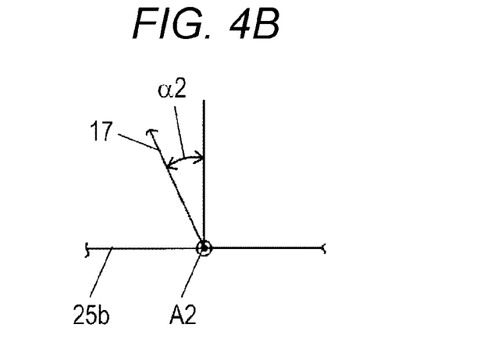
Figure 4C:
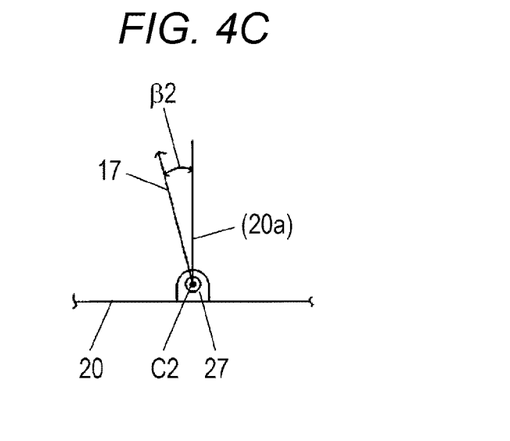

In the operation of linking mechanism 19 in work robot 7, operation is transferred from linking member 17 to movable unit 20 while second joint 18 is bent. FIGS. 4B and 4C indicate a bending angle of second joint 18 during operation of linking mechanism 19. That is, as shown in FIG. 4B, first bending angle $\alpha 2$ is an angle about center of rotation line A2 formed between the Z axis and the axis line of linking member 17. In addition, second bending angle $\beta 2$ indicated in FIG. 3C is an angle about center of rotation line C2 formed between virtual line 20a that is perpendicular to movable unit 20 and the axis line of linking member 17.

When movable unit 20 is driven via linking mechanism 19, driving is transmitted to movable unit 20 while performing the bending operation in first joint 16 and second joint 18 in each linking member 17. At this time, first joint 16 and second joint 18 are not permitted to unlimitedly bend, and bending is permitted only within the operable range that is restricted due to the shape of the mechanism which configures first joint 16 and second joint 18. For example, in first joint 16, the bending operation such that bearing 23 interferes with arm member 15 is not permitted. In the same manner, in second joint 18, the bending operation such that bearing 26 interferes with bearing 27 is not permitted.

When motor M is driven by an operation instruction such that the operable range is exceeded, there is a concern that a defect is caused such as damage due to overload of motor M and corruption of the mechanism as a result of motor M being driven in a state of mechanical interference being generated in first joint 16 and second joint 18. In work device 1 indicated in the present embodiment, the condition of the bending angle corresponding to a normal bending state in first joint 16 and second joint 18 is specified in advance as operable range data such that an operation instruction such that first joint 16 and second joint 18 perform the bending operation exceeding the operable range is not output with respect to motor M.

That is, operable range data that indicates a combination of first bending angle $\alpha 1$ and second bending angle $\beta 1$ which correspond to a normal bending state in first joint 16 and a combination of first bending angle $\alpha 2$ and second bending angle $\beta 2$ which correspond to a normal bending state in second joint 18 is generated and stored. Then, when motor M is controlled in order to move movable unit 20 based on an operation pattern that is stored in advance, presence or absence of the defect is determined with reference to the operable range data.

Figure 5:
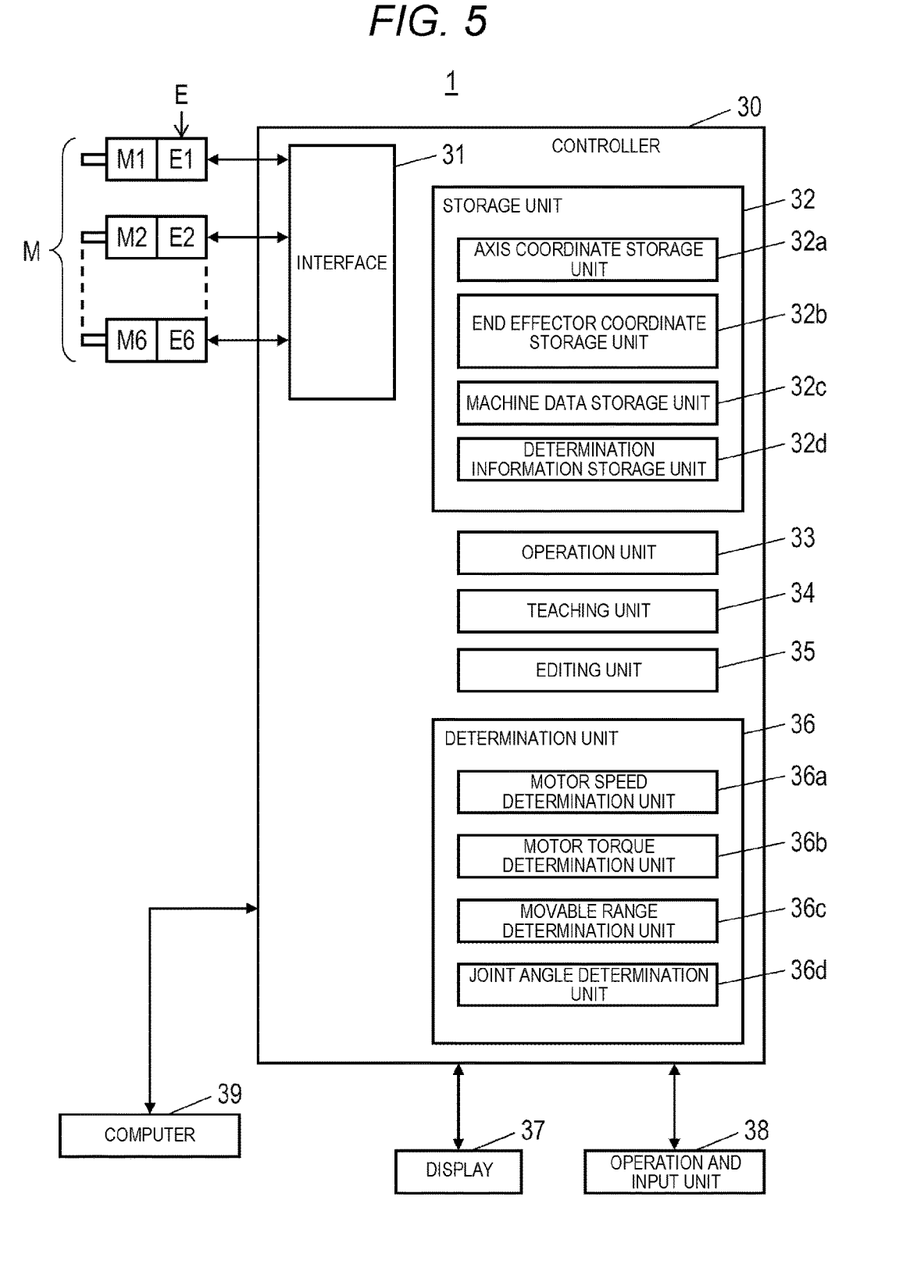
FIG. 5 is a block diagram illustrating a configuration of a control system of the work device of the embodiment.

The configuration of a control system of work device 1 will be described with reference to FIG. 5. In FIG. 5, controller 30 functions to move end effector 8 by operating motors M that are a plurality of actuators, and is provided with interface 31, storage unit 32, operation unit 33, teaching unit 34, editing unit 35, and determination unit 36.

Furthermore, display 37, operation and input unit 38, and computer 39 are connected to controller 30. Display 37 and operation and input unit 38 have a display function and operation and input function that are built into operation panel 9. Display 37 displays various screens on a display screen such as a liquid crystal panel of operation panel 9. In addition, operation and input unit 38 performs various operation inputs by an operator performing a touch operation to access operation panel 9.

Computer 39 is an external computer that is connected to work device 1 via a LAN system and the like. As a processing function of computer 39, a process such as storage, generation, and editing of the operation pattern, data management such as uploading and downloading of various data including the operation pattern, output of operation instruction data necessary in operation of work device 1, and the like are included. That is, computer 39 is provided with a function that is capable of executing a partial or full function of controller 30 as an alternative to controller 30 according to need.

Motors M (motor M1 to motor M6) and encoders E (encoder E1 and encoder E6) that are associated thereto are connected to interface 31. It is possible to move end effector 8 by operating by transmitting a control instruction from controller 30 to motor 1 to motor M6 that are a plurality of actuators via interface 31. Thereby, a predetermined work operation is executed. A function to operate motor M1 to motor 6 is executed by a processing function that is provided in operation unit 33. In addition, axis coordinate data that is output from encoders E (encoder E1 to encoder E6) is incorporated via interface 31, and transmitted to storage unit 32 and teaching unit 34 described below.

Storage unit 32 is provided with axis coordinate storage unit 32a, end effector coordinate storage unit 32b, machine data storage unit 32c, and determination information storage unit 32d. Axis coordinate storage unit 32a and end effector coordinate storage unit 32b are operation pattern storage units that store the operation pattern of the work operation that is executed by some end effector 8. Axis coordinate storage unit 32a stores the operation pattern that is described above according to coordinate data ($\theta 1$-$\theta 6$) that indicates individual axis rotation positions of a plurality of motors M (motor M1 to motor M6). End effector coordinate storage unit 32b stores the operation pattern that is described above according to geometric three-dimensional coordinate data (X, Y, Z, $\theta x$, $\theta y$, $\theta z$) of end effector 8. Note that, the three-dimensional coordinate data (X, Y, Z, $\theta x$, $\theta y$, $\theta z$) of end effector 8 and axis coordinate data ($\theta 1$, $\theta 2$, $\theta 3$, $\theta 4$, $\theta 5$, $\theta 6$) correspond uniquely, and data conversion is possible with each other by computing.

Machine data storage unit 32c stores specification data that specifies machine data such as the size of the mechanism that configures work robot 7 and the data is referenced in various determination by determination unit 36. For example, in the determination of bending operation possibility by joint angle determination unit 36d, presence or absence of mechanical interference in the bending operation of first joint 16 and second joint 18 is determined based on data that is included in machine data storage unit 32c. Determination information storage unit 32d stores determination information such as a determination threshold level that is used in the various determination by determination unit 36 described below. The operable range data that specifies in advance conditions of the bending angle corresponding to the normal bending state in first joint 16 and second joint 18 is included in the determination information.

Figure 6A:
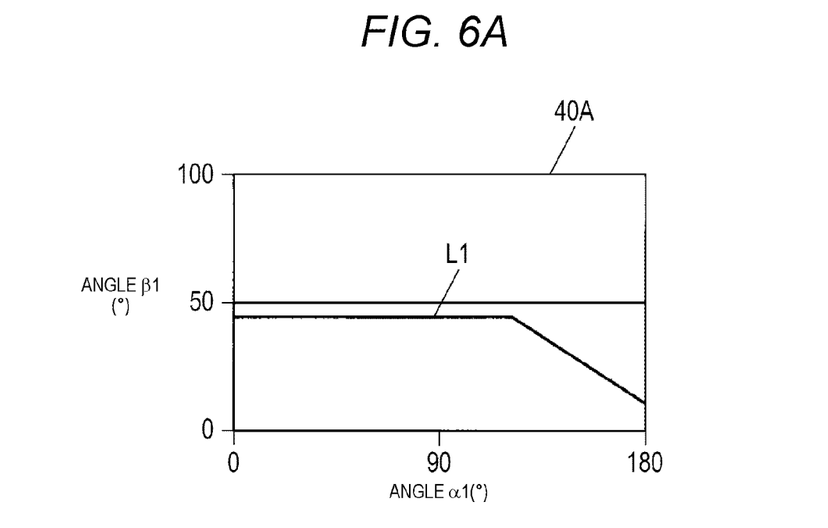
FIGS. 6A and 6B are graphs illustrating an operable range in combination of bending angles of two directions of the first joint and a second joint which are used in the work robot that is built into the work device of the embodiment.
Figure 6B:
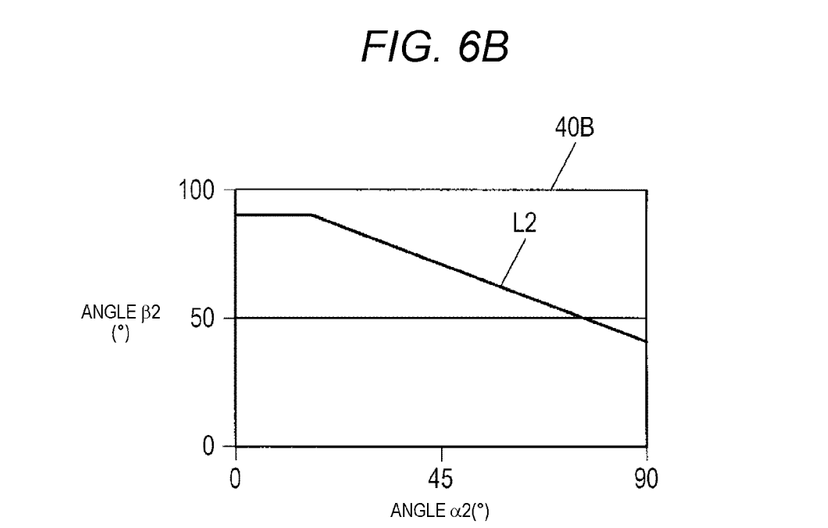

FIGS. 6A and 6B indicate examples of the operable range data that is included in determination information storage unit 32d. Operable range graph 40A indicated in FIG. 6A specifies conditions of the bending angle corresponding to the normal bending state in first joint 16. That is, in operable range graph 40A, in combination of first bending angle $\alpha 1$ and second bending angle $\beta 1$ that are specified on orthogonal coordinates that are made by the horizontal axis being first bending angle $\alpha 1$ and vertical axis being second bending angle $\beta 1$, upper limit line L1 that indicates a boundary of an area in which it is possible to normally perform the bending operation without mechanical interference being generated in a mechanical part of first joint 16 is specified. Upper limit line L1 indicates an upper limit value of second bending angle β1 that is permissible corresponding to first bending angle α1 indicated in the horizontal axis, and in a case of the combination of first bending angle α1 and second bending angle β1 belonging to an area below upper limit line L1, indicates a possibility of a normal bending operation.

FIG. 6B specifies conditions of the bending angle corresponding to the normal bending state in second joint 18. That is, in operable range graph 40B, in combination of first bending angle α2 and second bending angle β2 that are specified on orthogonal coordinates that are made by the horizontal axis being first bending angle α2 and vertical axis being second bending angle β2, upper limit line L2 that indicates a boundary of an area in which it is possible to perform normal bending angle without mechanical interference being generated in a mechanical part of second joint 18 is specified. In the same manner, upper limit line L2 indicates an upper limit value of second bending angle β2 that is permissible corresponding to first bending angle α2 indicated in the horizontal axis, and in a case of the combination of first bending angle α2 and second bending angle β2 belonging to an area below upper limit line L2, indicates a possibility of a normal bending operation.

Operation unit 33 functions to drive motors M (M1 to M6) according to the operation pattern that is stored in axis coordinate storage unit 32a or end effector coordinate storage unit 32b that are operation pattern storage units. That is, operation unit 33 that is provided in controller 30 operates to transmit a control instruction according to the operation pattern to motor M1 to motor M6 via interface 31. Teaching unit 34 executes a teaching process for teaching the work operation that is to be executed by end effector 8.

The teaching process is performed by the operator executing an operation for enabling a teaching function with respect to controller 30, for example, an operation for activating a teaching program that is stored in advance via operation and input unit 38. In the teaching process, information that is output from encoder E of each motor M is read via interface 31 in a fixed period, and is written to axis coordinate storage unit 32a as axis coordinate data (θ1, θ2, θ3, θ4, θ5, θ6) of each motor M. Editing unit 35 performs a data editing process which generates the operation pattern based on axis coordinate data that is written to axis coordinate storage unit 32a.

Determination unit 36 is provided with motor speed determination unit 36a, motor torque determination unit 36b, movable range determination unit 36c, and joint angle determination unit 36d. Motor speed determination unit 36a determines whether or not rotation speed that is required in motor M is within a range of a permissible number of rotations that is permissible for motor M based on determination information that is stored in determination information storage unit 32d in work operation in which motor M is operated according to the operation pattern that is stored in axis coordinate storage unit 32a or end effector coordinate storage unit 32b.

In the same manner, motor torque determination unit 36b determines whether or not torque that is required in motor M is within a range of a permissible torque that is permissible for motor M based on determination information that is stored in determination information storage unit 32d in work operation in which motor M is operated according to the stored operation pattern. Movable range determination unit 36c determines whether or not a movement range that is required in movable unit 20 is within a movable range that is stored in advance in determination information storage unit 32d in work operation in which motor M is operated according to the stored operation pattern.

Joint angle determination unit 36d determines whether or not the bending angle of linking mechanism 19 in first joint 16 and second joint 18 is within the operable range in work operation in which motor M is operated using the operation pattern that is stored in axis coordinate storage unit 32a or end effector coordinate storage unit 32b. That is, concerning first joint 16 that is a universal joint that has first rotation shaft 21a and second rotation shaft 21b which intersect with each other, it is determined whether or not a combination of first bending angle α1 about first rotation shaft 21a and second bending angle β1 about second rotation shaft 21b is within the operable range (area below upper limit line L1) that is specified in operable range graph 40A indicated in FIG. 6A.

In the same manner, concerning second joint 18 that is a universal joint that has first rotation shaft 25a and second rotation shaft 25b which intersect with each other, it is determined whether or not a combination of first bending angle α2 about first rotation shaft 25a and second bending angle β2 about second rotation shaft 25b is within the operable range (area below upper limit line L2) that is specified in operable range graph 40B indicated in FIG. 6B.

In the determination process by joint angle determination unit 36d described above, axis coordinate data (θ1-θ6) of motors M1 to M6 or three-dimensional coordinate data (X, Y, Z, θx, θy, θz) of end effector 8 in operation execution process is obtained using the operation pattern that is stored in axis coordinate storage unit 32a or end effector coordinate storage unit 32b. Next, the bending angles that are required in first joint 16 and second joint 18 are calculated at each timing of the operation execution process. That is, first bending angle α1 and second bending angle β1 in first joint 16 and first bending angle α2 and second bending angle β2 in second joint 18 are obtained.

Then, it is determined whether or not the combination of first bending angle α1 and second bending angle β1 that are obtained by the calculation is within the operable range in comparison with operable range graph 40A indicated in FIG. 6A. In the same manner, it is determined whether or not the combination of first bending angle α2 and second bending angle β2 in second joint 18 is within the operable range in comparison with operable range graph 40B indicated in FIG. 6B.

Note that, the timing of executing determination of whether or not the combination is within the operable range using joint angle determination unit 36d may be set while moving work robot 7 during operation of work device 1. In this case, it is determined whether or not the combination is within the operable range described above based on the immediately previous operation pattern in which an operation instruction is output to each motor M by operation unit 33. Then, as a result of the determination, in a case where the combination of first bending angle α1 and second bending angle β1 in first joint 16 and the combination of first bending angle α2 and second bending angle β2 in second joint 18 are determined to be out of the operable range, joint angle determination unit 36d stops driving of motor M that is an actuator. Thereby, it is possible to always monitor presence or absence of an inoperable location that is outside the operable range in the operation pattern.

In addition, determination of whether or not the combination is within the operable range by joint angle determination unit 36d is executed prior to commencement of the work by work robot 7, and the determination result may be displayed on display 37. In this case, in a graph that joint angle determination unit 36d causes display 37 to display, together with a graph indicating the operation pattern, a location where combination of first bending angle α1 and second bending angle β1 in first joint 16 and combination of first bending angle α2 and second bending angle β2 in second joint 18 are determined to be outside the operable range to be emphasized, and the operator is able to easily recognize the inoperable location.

Figure 7:
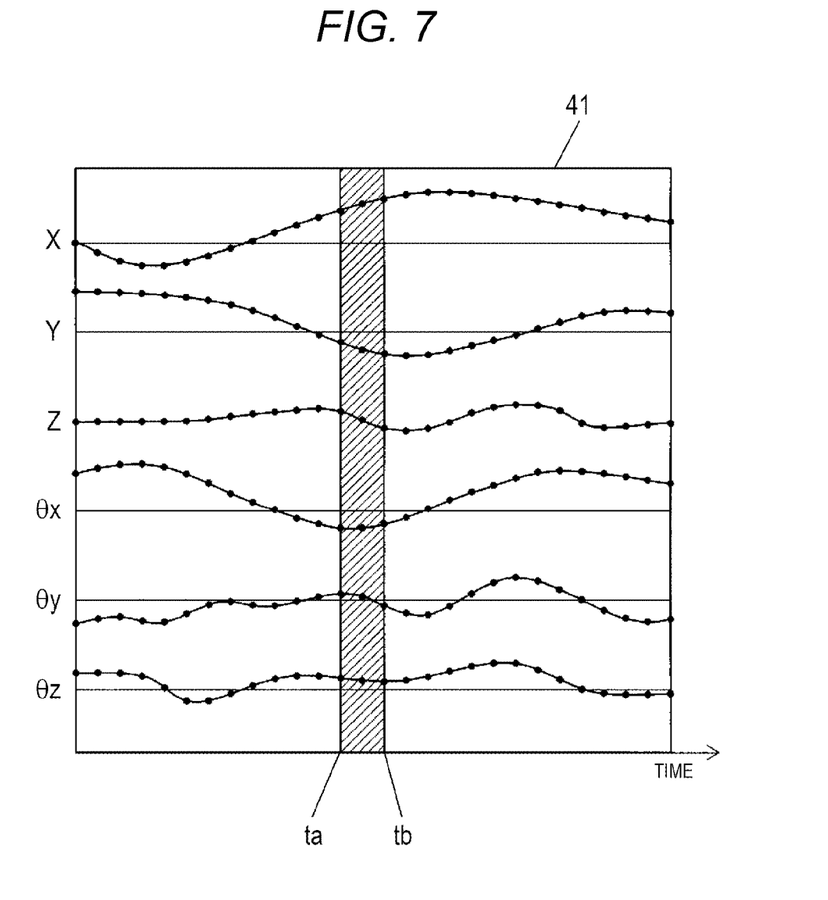
FIG. 7 is a graph illustrating a display example of an inoperable location in an operation pattern of the work robot that is built into the work device of the embodiment.

FIG. 7 indicates a display example of the inoperable location. That is, in FIG. 7, graph 41 indicates the operation pattern that is the determination target, and here, change over time of the three-dimensional coordinate data (X, Y, Z, θx, θy, θz) that indicates an operation path of end effector 8 in the operation pattern is indicated by the graph in which the horizontal axis is a time axis. In graph 41, a range of timing ta to tb that is indicated by hatching indicates a range that is determined to be the inoperable location in determination of whether or not the combination is within the operable range by joint angle determination unit 36d.

That is, in a case where the combination of first bending angle α1 and second bending angle β1 in first joint 16 and combination of first bending angle α2 and second bending angle β2 in second joint 18 are outside the operable range, joint angle determination unit 36d emphasizes the location of the operation pattern that is displayed on display 37. Thereby, it is possible for the operator to easily recognize that the inoperable location is present prior to commencement of the work by work robot 7. Note that, in graph 41, an example that is hatched is indicated as an example of emphasis of the range that is determined to be the inoperable location, but it is possible to apply various display methods such as a method in which the pattern or color of a background image of the location is changed, a method in which the location is enclosed by a figure to easily visually recognize the location, and a method in which the location is caused to flash on the display screen.

In the related art described above, when mechanical interference of the movable unit is effectively prevented, there is the following problem. That is, in the linking mechanism of the parallel link robot, the universal joint to which rotation about a plurality of axes is transmitted is used at a plurality of locations, and the operation is transmitted by bending the universal joint in the movable unit. However, in the related art described above, although a space position where it is possible to operate the movable unit is specified by movable area data that is stored in advance, when the movable unit is moved within the movable area of the data, the ability to realize the bending state which is required in the universal joint of individual linking mechanisms is not necessarily secured. Therefore, there is a concern that interference is generated between the mechanisms such as a bearing that configures the joint and a defect is caused such as deformation, damage, and the like of the mechanism due to the bending operation of the universal joint that is initially not permissible in the mechanism configuration being forced.

Work device 1 indicated in the present embodiment is provided with movable unit 20 that is fixed to base unit 7a via a plurality of linking mechanisms 19, motors M that are a plurality of actuators which drive the plurality of linking mechanisms 19, and controller 30 that controls the movable unit and the motors based on the operation pattern. In work device 1, controller 30 may have joint angle determination unit 36d that determines whether or not the bending angle of the linking mechanism in the joint of each linking mechanism is within the operable range based on machine data stored in machine data storage unit 32c and determination information which is stored in advance in determination information storage unit 32d and in which a combination of the bending angle that is permissible in the joint is specified in advance. Thereby, it is possible to prevent interference between mechanisms such as a bearing due to the bending operation being performed exceeding the operable range in first joint 16 and second joint 18, and it is possible to prevent defects such as deformation or damage of the mechanism due to the bending operation that is initially not permissible in the mechanism configuration being forced.

As described above, a work device includes base unit 7a, movable unit 20 configured to have end effector 8 mounted thereto, linking mechanisms 19 linking base unit 7a the movable unit 20, actuators (motors M) fixed to base unit 7a for driving linking mechanisms 19, respectively, and controller 30 that moves end effector 8 by operating the actuators. Certain linking mechanism 19 out of linking mechanisms 19 includes joint 16 (18). Controller 30 includes joint angle determination unit 36d that determines whether or not bending angle α1 (α2, β1, β2) of linking mechanism 19 at joint 16 (18) is within an operable range.

Controller 30 may include operation pattern storage unit (32a, 32b) that stores an operation pattern and operation unit 33 that drives the actuators based on the operation pattern stored in operation pattern storage unit (32a, 32b). In this case, joint angle determination unit 36d determines, by using the operation pattern, whether or not bending angle α1 (α2, β1, β2) of certain linking mechanism 19 of joint 16 (18) is within the operable range.

Joint 16 (18) may be a universal joint including rotation shaft 21a (25a) and rotation shaft 21b (25b) which cross each other. Joint angle determination unit 36d determines whether or not a combination of bending angle α1 (α2) about rotation shaft 21a (25a) of joint 16 (18) and bending angle β1 (β2) about rotation shaft 21b (25b) is within the operable range.

Work device 1 may further includes display 37 that displays the operation pattern. In the case where the combination is outside the operable range, joint angle determination unit 36d displays a location in the operation pattern displayed on display 37 at which the combination is outside the operable range such that the location can be distinguished from a part in the operation pattern other than the location.

Joint angle determination unit 36d may stop the actuator in the case where the combination of bending angle α1 (α2) and bending angle β1 (β2) is determined to be outside the operable range.

The work device of the embodiment has an effect of being able to prevent interference caused by performing the bending operation exceeding the operable range in the joint, and is useful in a field in which an operation is performed by the work device that is provided with the linking mechanism which drives the movable unit via the joint such as a parallel link robot.

What is claimed is:
1. A work device comprising:
   a base unit;
   a movable unit configured to have an end effector mounted thereto;
   a plurality of linking mechanisms linking the base unit to the movable unit;
   a plurality of actuators fixed to the base unit for driving the plurality of linking mechanisms, respectively; and a controller that moves the end effector by operating the plurality of actuators, wherein at least one of the plurality of linking mechanisms includes a linking member, a first bendable joint linked to one end of the linking member and a second bendable joint linked to another end of the linking member, and wherein the controller includes a joint angle determination unit that determines whether or not a bending angle of the linking mechanism at each of the first joint and the second joint is within an operable range.

2. The work device of claim 1, wherein each of the first joint and the second joint is a universal joint including a first rotation shaft and a second rotation shaft which cross each other, and wherein the joint angle determination unit determines whether or not a combination of a first bending angle about the first rotation shaft and a second bending angle about the second rotation shaft is within the operable range.

3. The work device of claim 2, wherein the joint angle determination unit stops the actuator in a case where the combination is determined to be outside the operable range.

4. The work device of claim 1, wherein the controller includes:
 an operation pattern storage unit that stores an operation pattern; and
 an operation unit that drives the plurality of actuators based on the operation pattern stored in the operation pattern storage unit, and wherein the joint angle determination unit determines, by using the operation pattern, whether or not the bending angle of the linking mechanism at each of the first joint and the second joint is within the operable range.

5. The work device of claim 4, wherein each of the first joint and the second joint is a universal joint including a first rotation shaft and a second rotation shaft which cross each other, and wherein the joint angle determination unit determines whether or not a combination of a first bending angle about the first rotation shaft and a second bending angle about the second rotation shaft is within the operable range.

6. The work device of claim 5, further comprising a display that displays the operation pattern, wherein in a case where the combination is outside the operable range, the joint angle determination unit displays a location in the operation pattern displayed on the display at which the combination is outside the operable range such that the location can be distinguished from a part in the operation pattern other than the location.

7. The work device of claim 5, wherein the joint angle determination unit stops the actuator in a case where the combination is determined to be outside the operable range.

8. The work device of claim 1, wherein at least one pair of the first joints are connected to each other.

9. The work device of claim 1, wherein each of the plurality of linking mechanisms includes a pair of linking members, a pair of first bendable joints each linked to one end of each of the linking members and a pair of second bendable joints each linked to another end of each of the linking members, and wherein the pair of first bendable joints are connected to each other.

* * * * *